(12) United States Patent
Van Rooyen

(10) Patent No.: US 7,208,534 B2
(45) Date of Patent: Apr. 24, 2007

(54) SOLVENT BASED COATING COMPOSITION

(75) Inventor: Arthur Jozef Gerardus Van Rooyen, Sassenheim (NL)

(73) Assignee: Akzo Nobel N.V., Arnhem (NL)

( * ) Notice: Subject to any disclaimer, the term of this patent is extended or adjusted under 35 U.S.C. 154(b) by 504 days.

(21) Appl. No.: 09/992,995

(22) Filed: Nov. 6, 2001

(65) Prior Publication Data

US 2002/0111421 A1 Aug. 15, 2002

Related U.S. Application Data

(60) Provisional application No. 60/250,936, filed on Dec. 2, 2000.

(30) Foreign Application Priority Data

Nov. 6, 2000 (EP) .................................. 00203882

(51) Int. Cl.
*C08L 1/10* (2006.01)

(52) U.S. Cl. ........................... 524/37; 524/38; 524/39; 524/41; 524/589

(58) Field of Classification Search ................ 524/507, 524/513, 515, 522, 523, 37, 38, 39, 41, 489, 524/589
See application file for complete search history.

(56) References Cited

U.S. PATENT DOCUMENTS

| 4,168,249 | A |   | 9/1979  | Meyer ......................... 260/16 |
| 4,532,177 | A |   | 7/1985  | Mahar |
| 4,960,828 | A |   | 10/1990 | Higuchi et al. |
| 6,258,897 | B1| * | 7/2001  | Epple et al. ................. 525/437 |

FOREIGN PATENT DOCUMENTS

| DE | 29 24 632  | 1/1981 |
| EP | 0547614 A2 | 6/1993 |
| EP | 0 794 237 A2 | 9/1997 |
| JP | 04-154877 A | 4/1992 |
| JP | 10-046067 A | 10/1998 |
| RO | 109455 | 2/1995 |

OTHER PUBLICATIONS

"Cellulose Esters, Organic Esters", Gedon et al, Kirk-Othmer Encyclopedia of Chemical Technology (1993).*
Derwent Abstract No.: 07854 abstracting DE 29 24 632.
Derwent Abstract No.: XP-002164571 abstracting RO109455.
Laid-Open Patent No.: 98-46067.
English language translation of Japanese Patent Application Laid-Open No. 04-154877 A.
English language translation of Japanese Patent Application Laid-Open No. 10-046067 A.

* cited by examiner

*Primary Examiner*—Edward J. Cain
(74) *Attorney, Agent, or Firm*—Michelle J. Burke; David H. Vickrey; Robert C. Morriss

(57) ABSTRACT

The present invention pertains to a solvent based coating composition comprising
A) at least one toner base comprising an acrylic polyol, a cellulose resin, a polyester polyol, and a pigment,
B) at least one connector base comprising at least one resin compatible with the resins mentioned in toner base A), and
C) at least one reducer base free of resins and pigments.

It has been found that the coating composition of the present invention does not have drawbacks such as insufficient hiding, a high sensitivity for cloudiness, and a loss of brightness or color. Such drawbacks are often found in base coat compositions. Furthermore, the coating composition of the present invention provides a very flexible application window. Due to a selection of resins, additives, and/or fillers to be used in the connector base (B), the use and properties of the coating composition of the present invention can be modified. For example, an interior coating may be prepared from the coating composition of the present invention with excellent properties such as gloss level and scratch resistance.

12 Claims, No Drawings

_US 7,208,534 B2_

SOLVENT BASED COATING COMPOSITION

This application claims priority of European Patent Application No. 00203882.6 filed Nov. 6, 2001 and Provisional U.S. Application Ser. No. 60/250,936 filed Dec. 2, 2000.

FIELD OF THE INVENTION

The present invention pertains to solvent based coating compositions and their use in car refinish applications.

BACKGROUND OF THE INVENTION

DE-A-29 24 632 discloses a solvent based base coat composition comprising:
A) a toner composition comprising an effect pigment, an acrylic resin, a polyester, and a cellulose ester,
B) a toner composition comprising a solid colour pigment and an acrylic polyol incompatible with the resins in toner composition A, and
C) a third component comprising a cellulose ester and an acrylic resin.

EP-A-0 794 237 discloses a coating composition comprising:
A) a metallic base and a tint base,
B) a metallic base booster comprising an alkyd resin as a film forming polymeric material,
C) a reducer being a solvent blend with or without reactive diluents, and
D) a hardener such as a polyisocyanate.

Other film forming polymeric materials include acrylics and polyesters.

JP-A-98-46067 discloses a coating composition comprising
A) a toner composition comprising an acrylic resin, an alkyd resin, a cellulose resin, and a pigment, and
B) a reducer base containing a solvent mixture.

U.S. Pat. No. 4,532,177 discloses a base coat composition comprising a film-forming resin selected from, among others, a polyester and an acrylic, blended with a cellulose ester material and a pigment.

SUMMARY OF THE INVENTION

The present invention pertains to a solvent based coating composition comprising
A) at least one toner base comprising an F acrylic polyol, a cellulose resin, a polyester polyol, and a pigment,
B) at least one connector base comprising at least one resin compatible with the resins mentioned in toner base A), and
C) at least one reducer base free of resins and pigments.

It has been found that the coating composition of the present invention does not have drawbacks such as insufficient hiding, a high sensitivity for cloudiness, and a loss of brightness or colour. Such drawbacks are often found in base coat compositions. Furthermore, the coating composition of the present invention provides a very flexible application window. Due to a selection of resins, additives, and/or fillers to be used in the connector base (B), the use and properties of the coating composition of the present invention can be modified. For example, an interior coating with excellent properties such as gloss level and scratch resistance may be prepared from the coating composition of the present invention.

DETAILED DESCRIPTION OF THE INVENTION

The compatible resin which is used in the connector base (B) is preferably selected from an acrylic polyol, a cellulose resin, a polyester polyol, a polyurethane polyol, a vinyl resin, a polyisocyanate, and/or mixtures thereof.

Also preferred is that toner base (A) and connector base (B) together comprise the following resins:
10–40 wt. % on solids of cellulose resin,
25–60 wt. % on solids of acrylic polyol,
15–45 wt. % on solids of polyester polyol, and
0–20 wt. % on solids of a compatible resin, the sum of the wt. % indicated for the resins always being 100 wt. %.

Preferably, the resins are divided over toner base (A) and connector base (B) whereby toner base (A) comprises at least 25 wt. % on solids of resins and connector base (B) comprises at most 75 wt. % on solids of resins. More preferably, toner base (A) comprises 25 to 95 wt. % on solids of resins and connector base (B) comprises 5 to 75 wt. % on solids of resins. Most preferably, toner base (A) comprises 50 to 90 wt. % on solids of resins and connector base (B) comprises 10 to 50 wt. % on solids of resins.

In a preferred embodiment both toner base (A) and connector base (B) comprise the same type of resins. Alternatively, both toner base (A) and connector base (B) may comprise the same resins. In a more preferred embodiment thereof, the resins in toner base (A) and connector base (B) are used in the same ratio. Thus a base coat composition with excellent coating properties can be prepared.

Alternatively, by using different resins in the connector base (B) coating compositions having different properties can be prepared. The presence of a cellulose resin within connector base (B) provides a base coat composition according to the invention with a fast drying time. Such a base coat can then be advantageously used in striping or decoration.

The presence of a polyester polyol in the connector base (B) will result in a more sluggish yet much more flexible base coat composition for plastic surfaces.

It is also possible to provide a connector base (B) comprising additives, such as wax, and fillers, such as fumed silica, to provide a low gloss coating composition to be used as an interior coating composition. However, in a base coat application it is preferred that the connector base (B) is pigment free.

The presence of a polyol in the toner base (A) and/or the connector base (B) provides the possibility to chemically cross-link the coating composition. For example, a polyol can be cross-linked with an isocyanate hardener, resulting in a simple 2K system for door jams and inside (under the hood) use. To this end, the base coat composition may comprise a cross-linker base (D). Preferably, the cross-linker base (D) comprises an isocyanate hardener.

Examples of the resins used in the coating composition of the present invention are explained below.

The acrylic polyol may be derived from hydroxy-functional acrylic monomers, such as hydroxy ethyl (meth)acrylate, hydroxy propyl (meth)acrylate, hydroxy butyl (meth)acrylate, other acrylic monomers such as (meth)acrylic acid, methyl (meth)acrylate, butyl (meth)acrylate, isobutyl (meth)acrylate, optionally in combination with a vinyl derivative such as styrene, and the like, or mixtures thereof, the terms (meth)acrylate and (meth)acrylic acid referring to both methacrylate and acrylate, as well as methacrylic acid and acrylic acid, respectively. The polyacrylate is prepared by conventional methods, for instance by the slow addition of appropriate monomers to a solution of an appropriate polymerisation initiator, such as an azo or peroxy initiator. Preferably, the acrylic polyol is prepared from hydroxy propyl methacrylate, methyl methacrylate, butyl methacrylate, isobutyl methacrylate, styrene, and/or methacrylic acid.

The acrylic polyol may have a hydroxy value of between 25 and 300 mg KOH/g solid resin, preferably between 45 and 250 mg KOH/g solid resin. The number average molecular weight of the polymer may be lower than 25,000, as measured by gel permeation chromatography using polystyrene or polypropylene glycol as a standard. The degree of molecular dispersion, i.e. the ratio of Mw to Mn, preferably is in the range of 1.1. to 10, the range from 1.5 to 5 being particularly preferred. The acid value of the polymer may be between 0 and 50 mg KOH/g solid resin. The glass transition temperature may be above 10° C., preferably between 25 and 85° C. Cellulose resins are cellulose compounds esterified by at least one monocarboxylic acid. Examples of suitable monocarboxylic acids include monocarboxylic acids containing 2 to 5 carbon atoms, such as acetic acid, propionic acid and butyric acid. Of course, use may also be made of cellulose resins having different carboxylic acid groups or physical mixtures of different cellulose esters. The cellulose resins generally to be used in actual practice as a rule also contain a small amount of hydroxyl, for instance a few percent by weight. It is preferred that use should be made of a cellulose acetobutyrate. Commercial products include CAB 381-0.1, CAB 381-20, CAB 551-0.2, and CAB 553-0.4 from Eastman Kodak, and mixtures thereof.

The polyester polyol preferably is a branched polyester polyol. More preferably, the branched polyester polyol is the reaction product of
(a) at least one cycloaliphatic and/or aromatic polycarboxylic acid or derivatives thereof,
(b) at least one $C_{3-12}$ triol, and
(c) optionally, one or more monoalcohols, polyols, aromatic polycarboxylic acids, acyclic aliphatic polycarboxylic acids, monocarboxylic acids or glycidyl esters of monocarboxylic acid.

Particularly suitable polyester polyols for film forming resins and coating compositions of the present invention have a molecular weight (Mn) ranging from 500 to 5,000, preferably from 750 to 4,000, as determined by gel permeation chromatography using polystyrene or polypropylene glycol as a standard. The degree of molecular dispersion, i.e. the ratio of Mw to Mn, preferably is in the range of 1.1 to 10, ranges from 1.5 to 6 being preferred particularly. The acid value of the polyester polyol preferably is below 30, most preferably below 20. Suitable hydroxyl values are in the range of 50 to 300 mg KOH/g solid resin, preferably 75 to 250 mg KOH/g solid resin. The glass transition temperature may be below 25° C., preferably between 15 and −50° C.

The polyester polyols are prepared using conventional techniques. The reactants and the molar ratios of the reactants are chosen in such a way that they provide a reaction product having a number of residual hydroxyl groups. Typically, the polyester polyols are formed by charging the carboxylic and hydroxylic components in a suitable polymerisation vessel and heating the reaction mixture under an inert atmosphere to 150 to 260° C. with removal of condensation water. The reaction may be carried out in the presence of an esterification catalyst and is considered complete when the desired hydroxyl and acid values are obtained.

The polyester polyols preferably possess a branched structure. Branched polyesters are conventionally obtained through condensation of polycarboxylic acids or reactive derivatives thereof, such as the corresponding anhydrides or lower alkyl esters, with polyalcohols, when at least one of the reactants has a functionality of at least 3.

The polyester polyols may contain a sufficiently high amount of cyclic moieties to provide coatings of considerable hardness. Preferably, these cyclic moieties belong to the polycarboxylic components and are provided by cycloaliphatic or/and aromatic polycarboxylic acids or reactive derivatives thereof. To impart sufficient hardness, the molar ratio of the acyclic aliphatic polycarboxylic acids to the total of polycarboxylic acids is preferably less than 0.3:1, more preferably less than 0.1:1. Further, the molar ratio of the cycloaliphatic polycarboxylic acids to the total of polycarboxylic acids typically is in the range from 0.3:1 to 1:1, more preferably from 0.45:1 to 1:1.

Examples of suitable cycloaliphatic polycarboxylic acids or reactive derivatives thereof are tetrahydrophthalic acid, tetrahydrophthalic anhydride, hexahydrophthalic acid, hexahydrophthalic anhydride, methyl hexahydrophthalic acid, methyl hexahydrophthalic anhydride, dimethyl cyclohexane dicarboxylate, 1,4-cyclohexane dicarboxylic acid, 1,3-cyclohexane dicarboxylic acid, and mixtures thereof. Hexahydrophthalic anhydride and 1,4-cyclohexane dicarboxylic acid are preferred.

Examples of aromatic polycarboxylic acids and reactive derivatives thereof are phthalic acid, phthalic anhydride, isophthalic acid, terephthalic acid, 5-tert. butyl isophthalic acid, trimellitic anhydride, and mixtures thereof.

Examples of acyclic aliphatic polycarboxylic acids or reactive intermediates thereof are maleic acid, maleic anhydride, fumaric acid, succinic acid, succinic anhydride, dodecenyl succinic anhydride, dimethyl succinate, glutaric acid, adipic acid, dimethyl adipate, azelaic acid, and mixtures thereof. Adipic acid is preferred. Optionally, up to 20 wt. % of the acyclic aliphatic polycarboxylic acid is used in the preparation of the polyester polyol.

Up to 40 wt. % monocarboxylic acids, based on all monomers used for the preparation of the polyester polyol, preferably $C_4$–$C_{18}$ monocarboxylic acids, preferably are also among the reactants used to produce the polyester polyol. More preferably, 5 to 30 wt. % of monocarboxylic acids are used.

Examples of the $C_4$–$C_{18}$ monocarboxylic acids include pivalic acid, hexanoic acid, heptanoic acid, octanoic acid, nonanoic acid, 2-ethyl hexanoic acid, isononanoic acid, decanoic acid, lauric acid, myristic acid, palmitic acid, isostearic acid, stearic acid, hydroxystearic acid, benzoic acid, 4-tert. butyl benzoic acid, and mixtures thereof.

The one or more polyalcohol reactants used to form the polyester can be cyclic or acyclic or a mixture thereof. Preferred polyalcohols are triols. They can be used as the sole alcohol component but suitable polyesters can also be prepared from mixtures of triols or from mixtures of one or more triols with other OH-containing compositions, such as monoalcohols, diols, tetraols, and mixtures thereof. Preferably, from 5 to 40 wt. % of triol is used in the preparation of the polyester polyol.

Suitable triols are $C_{3-12}$ triols. Examples of triols are trimethylol propane, trimethylol ethane, glycerol, and 1,2,6-hexane triol. Trimethylol propane and trimethylol ethane are preferred.

Suitable diols are $C_2$–$C_{15}$ diols. Examples of diols are ethylene glycol, 1,2-propylene glycol, 1,3-propylene glycol, 2-methylpropane-1,3-diol, neopentyl glycol, 2-butyl-2- ethyl-1,3-propane diol, cyclohexane-1,4-dimethylol, the monoester of neopentyl glycol and hydroxypivalic acid, hydrogenated Bisphenol A, 1,5-pentane diol, 3-methyl-pentane diol, 1,6-hexane diol, 2,2,4-trimethyl pentane-1,3-diol, and dimethylol propionic acid. Neopentyl glycol, 1,6-hexane diol, 2-butyl-2-ethyl-1,3-propane diol, cyclohexane dimethylol, dimethylol propionic acid, and the monoester of neopentyl glycol and hydroxypivalic acid are preferred. Up to 50 wt. % of diol may be used in the preparation of the polyester polyol.

Suitable tetraols are $C_{4-12}$ tetraols. Examples of tetraols are pentaerythritol and di-trimethylol propane. Up to 20 wt. % of tetraol may be used in the preparation of the polyester polyol.

Suitable monoalcohols are, for example, $C_6$–$C_{18}$ monoalcohols. Specific examples are cyclohexanol, 2-ethylhexanol, stearyl alcohol, and 4-tert. butyl cyclohexanol. Up to 20 wt. % of monoalcohol may be used in the preparation of the polyester polyol.

To form the polyester, a combination of triol and monocarboxylic acid can also be used in the form of preformed glycidyl esters of $C_5$–$C_{15}$ monocarboxylic acids, for example the glycidyl esters of branched $C_9$–$C_{11}$ monocarboxylic acids, commercially available as Cardura E10 from Shell. Additionally or alternatively the polyester polyol may comprise some diurea groups, preferably about 1 to 10 wt. %.

Examples of the polyurethane polyol include the reaction product of a 2- to 5-functional polyisocyanate and a polyalcohol having at least 2 hydroxyl groups, or the reaction product of a polyamine and a cyclic carbonate. The reactants and the molar ratios of the reactants are chosen in such a way that they provide a reaction product having a number of residual hydroxyl groups. The cyclic moieties in the polyurethane polyol can be aromatic, cycloaliphatic, heterocyclic or mixtures thereof. The cyclic moieties may be present in the polyalcohol reactant(s) and/or the isocyanate reactant(s) of the polyurethane.

The 2- to 5-functional polyisocyanate preferably is isophorone diisocyanate, tetramethylxylene diisocyanate, methylene bis(4-cyclohexyl isocyanate), norbornane diisocyanate, isocyanurate trimer of isophorone diisocyanate, the reaction product of 3 moles of m-tetramethylxylene diisocyanate with 1 mole of trimethylol propane, the reaction product of 3 moles of toluene diisocyanate with 1 mole of trimethylol propane, toluene diisocyanate, the isocyanurate of hexamethylene diisocyanate, the uretdione of isophorone diisocyanate, the uretdione of hexamethylene diisocyanate, the allophanate of hexamethylene diisocyanate, and mixtures thereof. Particularly preferred are the isocyanurate trimer of isophorone diisocyanate, methylene bis(4-cyclohexyl isocyanate), and the reaction product of 3 moles of m-tetramethylxylene diisocyanate with 1 mole of trimethylol propane. Preferably, from 20 to 80 wt. % of polyisocyanate is used in the preparation of the polyurethane polyol, more preferably from 30 to 70 wt. %.

The polyalcohol is preferably selected from the group of diols and triols.

The diol preferably is selected from the group of ethylene glycol, 1,2-propane diol, 1,3-propane diol, 1,3-butane diol, 2-methyl-1,3-propane diol, 2-ethyl-2-butyl-1,3-propane diol, 2,2,4,-trimethyl-1,3-pentane diol, 2-ethyl-1,3-hexane diol, neopentyl glycol, cyclohexane dimethanol, hydrogenated Bisphenol A and mixtures thereof. Also preferred diols are low-molecular weight (Mn<500) condensates of dicarboxylic acids and monomeric diols, for example, as prepared from 1 mole of hexahydrophthalic anhydride and 2 moles of 2-butyl-2-ethyl-1,3-propane diol. Up to 70 wt. % of diol is used, preferably from 20 to 65 wt. %.

Triols preferred for use as the polyalcohol are glycerol, trimethylol propane, trimethylol ethane or mixtures thereof. Up to 25 wt. % of triol may be used, preferably 1 to 20 wt. %

Optionally, up to 30 wt. % of further reactant(s) for preparation of the polyurethane polyol may be used, such as $C_1$–$C_{18}$ monoalcohols, the molar ratio of monoalcohol to diol and/or triol component being less than 2, $C_2$–$C_{25}$ primary or secondary monoamine compounds, optionally substituted with a hydroxyl group, the molar ratio of the monoamine to diol and/or triol being lower than 2, and $C_2$–$C_{25}$ diamine compounds comprising primary and/or secondary amine groups, the molar ratio of the diamine to diol and/or triol being lower than 2.

Suitable monoalcohols are for example methanol, ethanol, butanol, 2-ethyl hexanol, cyclohexanol, benzyl alcohol, stearyl alcohol, and mixtures thereof.

Suitable monoamines are for example butyl amine, dibutyl amine, isopropanol amine, N-methyl ethanol amine, benzyl amine, and mixtures thereof.

Suitable diamines are for example isophorone diamine, cyclohexane diamine, propylene diamine, piperazine, aminoethyl piperazine, and mixtures thereof.

For the preparation of the polyurethane polyol the ratio of hydroxyl groups and, optionally, amine groups to isocyanate groups ranges from 1.2 to 3.

It is preferred that the number average molecular weight (Mn) of the polyurethane polyol is less than 5,000, most preferred are polyurethane polyols having a Mn of less than 3,000, as determined by gel permeation chromatography using polystyrene or polypropylene glycol as a standard. The degree of molecular dispersion, i.e. the ratio of Mw to Mn, preferably is in the range of 1.1 to 5, ranges from 1.1 to 3 being preferred particularly. Preferably, the polyurethane polyols have a hydroxyl number below 350 mg KOH/g solid resin, more preferably in the range from 50 to 350 mg KOH/g solid resin, even more preferably in the range of 50 to 250 mg KOH/g solid resin.

The synthesis of the polyurethane polyols of the invention preferably is carried out at a temperature of 125° C. or less, most preferably in the range from 15° C. to 100° C. The components may optionally be reacted in the presence of a polyurethane catalyst, for example organic tin compounds such as dibutyl tin dilaurate or tertiary amine such as triethylene diamine.

Examples of vinyl resins include copolymers of vinyl chloride and vinyl acetate. Preferably, the copolymer comprises 5 to 50% vinyl acetate. These copolymers are prepared using solution or suspension polymerisation techniques. Optionally, the vinyl resins may have hydroxy or acid groups. For example, hydroxy or acid groups can be incorporated into the copolymers of vinyl chloride and vinyl acetate by partial hydrolysis of the vinyl acetate or copolymerisation with maleic anhydride and hydroxy-functional (meth)acrylic monomers respectively, as known in the industry. Commercial vinyl resins include Vinylite (ex Union Carbide), Vilit (ex Huls), Vinnol (ex Wacker), and Solvic (ex Solvay). Preferably, vinyl resins from Union Carbide are used in the coating composition of the present invention. An example of such a resin is UCAR® solution vinyl VYNC-P prepared from vinyl chloride, vinyl acetate, and hydroxy alkyl acrylate.

The vinyl resin may have a hydroxy value of between 10 and 100 mg KOH/g solid resin, preferably between 20 and 50 mg KOH/g solid resin. The number average molecular weight of the polymer is lower than 30,000, as measured by gel permeation chromatography using polystyrene or polypropylene glycol as a standard, preferably less than 25,000. The degree of molecular dispersion, i.e. the ratio of Mw to Mn, preferably is in the range of 1.1. to 5. The glass transition temperature is above 10° C., preferably between 25 and 75° C.

Examples of polyisocyanates include those mentioned above in the preparation of a polyurethane polyol. Preferred polyisocyanates include the isocyanurate and biuret of hexane diisocyanate.

Applicable pigments may have an acid, a neutral or a basic character. Optionally, the pigments may be pre-treated to modify the properties. Examples of suitable pigments include metallic pigments such as aluminium and stainless steel; nacreous pigments, such as mica coated with a metal oxide such as iron oxide and/or titanium dioxide; inorganic pigments, such as titanium dioxide, iron oxide, carbon black, silica, kaolin, talc, barium sulphate, lead silicate, strontium chromate, and chromium oxide; and organic pigments, such as phthalocyanine pigments.

The solids content of the coating composition preferably ranges from 5–50 wt. %, more preferably from 10–40 wt. %.

The coating composition according to the invention may be applied to a substrate in any desirable manner, such as by roller coating, spraying, brushing, sprinkling, flow coating, dipping, electrostatic spraying, or electrophoresis, preferably by spraying.

Suitable substrates may be made of wood, metal, and synthetic material. Curing may be carried out at ambient temperature or, optionally, at elevated temperature to reduce the curing time. Optionally, the coating composition may be baked at higher temperatures in the range of, for instance, 60 to 160° C., in a baking oven over a period of 10 to 60 minutes.

The compositions are particularly suitable in the preparation of coated metal substrates, such as in the refinish industry, in particular the body shop, to repair automobiles and transportation vehicles and in finishing large transportation vehicles such as trains, trucks, buses, and aeroplanes. The compositions of the present invention may also be used in the first finishing of automobiles. The coating composition according to the present invention can be used as a base coat in a so-called base coat/clear coat system. The clear coat used in the base coat/clear coat system may for instance be a clear baking lacquer of a conventional polyacrylate/melamine composition. The clear coat may also be a two-component polyester or polyacrylate/polyisocyanate composition. The clear coat may be applied wet-on-wet on the base coat. Optionally, the base coat may be partially cured prior to the application of the clear coat. Also, the base coat may be fully cured prior to the application of the clear coat.

Alternatively, the coating composition according to the present invention can be used as an interior coating. In this particular embodiment, the coating composition can be applied over existing and new interior automotive parts. The substrates include ABS, RIM, polycarbonate, and polyolefin type plastic parts. It is not required to coat the interior coating with a clear coat.

The invention will be further described in the following examples, which must not be construed as limiting the scope of the present invention in any way.

EXAMPLES

Unless otherwise stated, the properties of the coating compositions and the resulting films are measured as follows.

The viscosity was measured in a DIN flow cup number 4 in accordance with DIN 53221-1987. The viscosity is given in seconds.

Visual assessment was made of mottling, Bénard cells, and EHO (Enamel Hold Out) on a scale of 1 to 10 (1=very bad, 10=excellent).

In a freshly applied, drying coating, pigment particles may be carried selectively towards the surface by drying currents. If the drying currents are uneven, the dry coating will show floating. In metallics, floating effects may disorient anisotropic aluminium flake pigments. For the resulting visual effect, which may be quite severe when compared with normal floating effects, the term mottling is used.

If the drying currents are uneven, the dry coating can also become organized in Bénard cells. Except that the overall colour of the surface is different from the bulk colour, Bénard cells patterns, or other irregular drying effects, will be visible as local colour differences.

The Enamel Hold Out (EHO) was determined as the total visual appearance. Each sample is rated for visual appearance on a scale of 1 to 10 (1=very bad appearance, 10=excellent appearance) by a panel of at least 3 people. The determination takes into account gloss, wrinkling, flow and image clarity/distinctness of image. The average number will give the EHO.

Intercoat adhesion is the adhesion between the base coat and the clear coat. The adhesion was tested using the so called pull-off test, in which a cross-cut at 45° is made with an Olfa® cutter, after which a standard type adhesion tape is stuck on the paint and gently pulled off again. The values 1–10 represent a scale for evaluation of the adhesion ranging from very poor adhesion (1) to excellent adhesion (10).

Adhesion was measured in accordance with the standard ISO 2409 (1992). A rectangular lattice pattern, reaching down to the substrate, is cut into the coating to be tested. After cutting, detached particles are removed by brushing or by pulling-off with adhesion tape. The area of detachment of the coating is scored on a 0–10 visual scale.

Long wave and short wave readings were made using a wave scan apparatus (Byk).

Gloss was measured in accordance with ISO 2813:1994 (angle 60°). The gloss is expressed in GU.

Flexibility was measured in accordance with GM 9503 P.

The chemical resistance of the coating was determined by the number of double rubs (1 double rub is 1 to-and-fro movement) needed to rub the coating through to the substrate. The number of double rubs is recorded. If the number of double rubs increases above 100, it is recorded as 100+.

Accelerated weathering was carried out with a Xenon-Arc Weatherometer in accordance with ISO 11341 (1994).

In the examples the following compounds are used.

Hydroxy group-containing polyacrylate A with the following monomer composition: 14.6 wt. % hydroxy propyl methacrylate, 37 wt. % methyl methacrylate, 47 wt. % butyl methacrylate, and 1.4 wt. % methacrylic acid. Mw=15,000; Mn=5,000 (GPC with polystyrene as standard); hydroxy value=57 mg KOH/g solid resin, acid value=10 mg KOH/g solid resin, Tg=40° C., and solids content=51 wt. % in butanol/xylene.

Hydroxy group-containing polyester B with the following monomer composition: 10 wt. % 3,5,5-trimethyl hexanoic acid, 49 wt. % hexahydrophthalic anhydride, 22 wt. % neopentyl glycol, and 19 wt. % trimethylol propane. Mn=1,700 (GPC with polystyrene as standard); hydroxy value=105 mg KOH/g solid resin, acid value=10 mg KOH/g solid resin, Tg=9° C., and solids content=75 wt. % in butyl acetate/xylene.

Hydroxy group-containing polyester C with the following monomer composition: 9 wt. % trimethylol propane, 6 wt. % phthalic anhydride, 12 wt. % adipic acid, 32 wt. % isophthalic anhydride, and 40 wt. % 1,6-hexane diol. Mn=1,000 (GPC with polystyrene as standard); hydroxy value=150 mg KOH/g solid resin, acid value=1,5 mg KOH/g solid resin, Tg=−25° C., and solids content=80 wt. % in butyl acetate/xylene.

Hydroxy group-containing polyester D with the following monomer composition: 5 wt. % trimethylol propane, 22.9 wt. % 1,4-cyclohexyl dicarboxylic acid, 29.3 wt. % adipic acid, and 42.8 wt. % 1,6-hexane diol. Mn=1,411 (GPC with polystyrene as standard); hydroxy value=110 mg KOH/g solid resin, acid value=7.2 mg KOH/g solid resin, and solids content=80 wt. % in butyl acetate.

Hydroxy group-containing polyacrylate E with the following monomer composition: 14.6 wt. % hydroxy propyl methacrylate, 37 wt. % methyl methacrylate, 32 wt. % isobutyl methacrylate, 15 wt. % styrene, and 1.4 wt. % methacrylic acid. Mw=61,000; Mn=21,000 (GPC with polystyrene as standard); hydroxy value=57 mg KOH/g solid resin, acid value=10 mg KOH/g solid resin, Tg=83° C., and solids content=40 wt. % in butyl acetate/xylene.

Setal 90173, a polyester polyol ex Akzo Nobel Resins

The CAB solution consists of 20 parts CAB 381-01 and 5 parts CAB 381-20 ex Eastman Kodak.

UCAR® solution vinyl resin VYNC-P ex Union Carbide, 40% in isopropyl acetate.

Desmodur® N75, the biuret of hexane diisocyanate, ex Bayer.

Syloid 169, a fumed silica ex WR Grace.

MPP-635F a wax ex Micro Powders Inc.

Fascat 4202 is a 10% DBTL solution in xylene, ex Air Products.

Irgazin DPP Red BO is a bright red pigment, ex Ciba-Geigy.

Heliogen Blue L7101 F is a blue pigment, ex BASF AG.

Sparkle Silver E5000AR is a metallic pigment, ex Silberline Ltd.

Iriodin 9215 is a pearl pigment ex Merck.

Example 1 and Comparative example A

Two blue metallic base coat compositions were prepared. The ratio of blue pigment, Heliogen Blue L7101 F, to metallic pigment, Sparkle Silver E5000AR, was 0.3. The pigments were added to the resin composition of toner base A. The pigment/resin ratio was 0.27. The following resin combinations (wt. % on solid resin) were tested.

|  | Comp. Ex. A | Ex. 1 |
|---|---|---|
| Resin composition of toner base A |  |  |
| CAB 381-0.1 | 19.6 | 14.0 |
| CAB 381-20 | 8.4 | 6.0 |
| Polyacrylate polyol A | 52.0 | 36.0 |
| Polyester polyol B | — | 24.0 |

|  | Comp. Ex. A | Ex. 1 |
|---|---|---|
| Resin composition of connector base B |  |  |
| CAB 381-0.1 | 4.9 | 3.5 |
| CAB 381-20 | 2.1 | 1.5 |
| Polyacrylate polyol A | 13.0 | 9.0 |
| Polyester polyol B | — | 6.0 |

Toner and connector bases A and B were mixed 1:1. Then the base coat compositions were set to a 18" DinC4 viscosity by adding the Reducer base C comprising conventional solvents.

Two panels pretreated with Autocryl Filler 3110 ex Akzo Nobel Coatings BV (wet-on-wet version) were sanded and sprayed with the above-mentioned base coats. A clear coat was sprayed wet-on-wet on the base coats prepared from Autoclear MS 2000: Hardener MS 30: 1.2.3 Slow ex Akzo Nobel Coatings BV in a ratio of 100:50:10. The coated panels were dried for 24 hours at ambient temperature and then aged overnight at 60° C. The resulting coating properties are listed below.

|  | Mottling | Bénard cells | EHO | Intercoat adhesion | Long wave | Short wave |
|---|---|---|---|---|---|---|
| Ex. 1 | 10 | 6 | 8 | 10 | 6.0 | 22.3 |
| Comp. Ex. A | 9 | 7 | 6 | 7 | 3.6 | 16.6 |

As can be seen from the results above, a base coat composition requires a toner base A comprising an acrylic polyol, a cellulose resin, and a polyester polyol.

Examples 2–4 and Comparative example B

|  | Ex. 2 | Ex. 3 | Ex. 4 |
|---|---|---|---|
| Toner base A |  |  |  |
| Component | Metallic | Pearl | Solid |
| Sparkle Silver E5000AR | 11 | – | – |
| Iriodin 9215 | – | 7 | – |
| Irgazin DPP Red BTR | – | – | 8.2 |
| CAB solution (21%) | 25.7 | 26.4 | 19.7 |
| Polyacrylate polyol A (51%) | 18.5 | 19.0 | 14.6 |
| Polyester polyol B (75%) | 4.2 | 4.3 | 4.0 |
| Polyester polyol C (80%) | 4.0 | 4.1 | 3.8 |
| Conventional additives/solvents | 36.6 | 39.2 | 49.7 |
| Connector base B |  |  |  |
| CAB solution (21%) | 22.9 |  |  |
| Polyacrylate polyol A (51%) | 16.4 |  |  |
| Polyester polyol B (75%) | 3.8 |  |  |
| Polyester polyol C (80%) | 3.6 |  |  |
| Conventional additives/solvents | 53.3 |  |  |

The base coat composition was prepared by mixing Toner base A and Connector base B in a weight ratio of 77:23. Subsequently, the mixture of A and B was mixed with Reducer base C containing conventional solvents in a volume ratio of 2:1.

The base coat compositions were sprayed on car door panels, pretreated with Autocryl Filler 3110 ex Akzo Nobel Coatings BV, and a clear coat was sprayed wet-on-wet on the base coats prepared from Autoclear MS 2000: Hardener MS 30: 1.2.3 Slow ex Akzo Nobel Coatings BV in a ratio of 100:50:10. The coated panels were dried for 30 minutes at 60° C. For comparison, Example 2 was repeated, except that a commercial solvent based base coat was used, Autobase ex Akzo Nobel Coatings BV in a similar metallic colour (Comparative example B). The results of the evaluation of the coatings are listed below. All properties score on a 0–10 visual scale.

| Example | Hiding | Spray-ability | Smooth-ness | Gloss | Cloudi-ness | Colour |
|---|---|---|---|---|---|---|
| B | 7 | 8 | 7 | 7 | 7 | 5 |
| 2 | 9 | 8 | 8 | 8 | 8 | 7 |
| 3 | 9 | 8 | 8 | 8 | 8 | 7 |
| 4 | 9 | 8 | 8 | 8 | — | 7 |

As can be seen from the results above, the coating composition of the present invention provides a base coat with excellent properties such as improved hiding and smoothness and metallic appearance control for metallic and pearl coatings (Examples 2 and 3).

Examples 5–9

| White toner base A Component | |
|---|---|
| Titanium dioxide | 23.2 |
| CAB solution (21%) | 21.2 |
| Polyacrylate polyol A (51%) | 15.5 |
| Polyester polyol B (75%) | 4.3 |
| Polyester polyol C (80%) | 4.1 |
| Conventional additives/solvents | 31.7 |

| Connector bases B Component | Matte | Gloss |
|---|---|---|
| UCAR (40%) | 6.4 | 5.1 |
| Desmodur N75 | 3.8 | 4.4 |
| Polyester polyol D (80%) | 16.0 | 20.5 |
| Wax | 10.9 | 4.4 |
| Fumed silica | 7.8 | 3.1 |
| Conventional additives/solvents | 55.1 | 62.5 |

An interior coating composition was prepared by mixing Toner base A and Connector base B in a weight ratio of 66:33. Subsequently, the mixture of A and B was mixed with Reducer base C containing conventional solvents in a volume ratio of 2:1. For intermediate gloss levels the converters B were intermixed in weight ratios 75:25, 50:50, and 25:75.

Two plastic panels (ABS) were sprayed with the above-mentioned interior coating compositions. The coated panels were dried for 24 hours at ambient temperature. Properties of the interior coatings are listed below.

| | Example | | | | |
|---|---|---|---|---|---|
| | 5 Gloss White | 6 75:25 | 7 50:50 | 8 25:75 | 9 Matte White |
| Gloss | 20 | 16 | 12 | 8 | 3 |
| Adhesion | 10 | n.d. | n.d. | n.d. | 10 |
| Flexibility | | | | | |
| 25 mm mandrel | 9.5 | n.d. | n.d. | n.d. | 9 |
| 50 mm mandrel | 10 | n.d. | n.d. | n.d. | 10 |
| Chemical Resistance Properties (Double Rubs) | | | | | |
| Armor-All | 100+ | n.d. | n.d. | n.d. | 100+ |
| SPF45 Sun Block | 100+* | n.d. | n.d. | n.d. | 100+* |
| Windex | 100+ | n.d. | n.d. | n.d. | 100+ |
| 10% Soap Solution | 100+ | n.d. | n.d. | n.d. | 100+ |
| 50% isopropanol/water | 100+ | n.d. | n.d. | n.d. | 100+ |
| Accelerated Weathering (Xenon-Arc Weatherometer) | | | | | |
| Gloss Change | | | | | |
| 500 hours | −0.2 | n.d. | n.d. | n.d. | −1.0 |
| 1,000 hours | −0.7 | n.d. | n.d. | n.d. | −0.5 |
| Colour Change (delta E) | | | | | |
| 500 hours | 0.45 | n.d. | n.d. | n.d. | 0.20 |
| 1,000 hours | 0.35 | n.d. | n.d. | n.d. | 0.20 |
| Chalking | | | | | |
| 500 hours | 9 | n.d. | n.d. | n.d. | 10 |
| 1,000 hours | 8 | n.d. | n.d. | n.d. | 9 |

*indicates that a small amount of coating was transferred to the cloth used for rubbing As can be seen from the results, the coating composition of the present invention provides a very flexible application window due to the compatibility of the resins used. The properties of the resulting coatings are excellent.

Examples 10–14

Examples 5 to 9 were repeated, except that in addition to Toner, Connector, and Reducer bases A, B, and C, a cross-linker base D was added in an amount of 10 wt. % on the total composition of A, B, and C. The cross-linker base comprises 65 wt. % of the isocyanurate of hexane diisocyanate. Properties of the interior coatings are listed below.

| Example | 10 | 11 | 12 | 13 | 14 |
|---|---|---|---|---|---|
| | Gloss White | 75:25 | 50:50 | 25:75 | Matte White |
| Gloss | 22 | 19 | 14 | 11 | 5 |

As can be seen from the results, the use of the cross-linker base does not have a negative influence on the gloss of the resulting coating. Furthermore, the coatings have excellent properties such as resistance to harsh chemicals and solvents.

Example 15

Example 2 was repeated with the proviso that the following connector base (B) was used.

| Connector base B | |
|---|---|
| CAB 551.02 (21%) | 28.2 |
| Polyacrylate polyol E (40%) | 18.0 |
| Setal 90173 (51%) | 11.3 |
| Conventional additives/solvents | 42.5 |

The results of the evaluation of the coating are listed below. All properties score on a 0–10 visual scale.

| Example | Sprayability | Appearance | Gloss | Adhesion 1 day | Adhesion 7 days |
|---|---|---|---|---|---|
| 15 | 8 | 8 | 8 | 10 | 10 |

I claim:

1. A process of preparing a solvent based coating composition comprising mixing
    A) at least one toner base comprising an acrylic polyol, a cellulose resin, a polyester polyol, and a pigment,
    B) at least one connector base comprising at least one resin compatible with the resins mentioned in toner base A), and
    C) at least one reducer base free of resins and pigments.

2. The process according to claim 1, wherein the compatible resin in the connector base (B) is selected from an acrylic polyol, a cellulose resin, a polyester polyol, a polyurethane polyol, a vinyl resin, a polyisocyanate, and/or mixtures thereof.

3. The process according to claim 1, wherein the toner base (A) comprises at least 26 wt. % on solids of resins and connector base (B) comprises at most 75 wt. % on solids of resins.

4. The process according to claim 1, wherein the toner base (A) and connector base (B) together comprise the following resins:
    10–40 wt. % on solids of cellulose resin,
    25–60 wt. % on solids of acrylic polyol,
    15–45 wt. % on solids of polyester polyol, and
    0–20 wt. % on solids of a compatible resin, the sum of the wt. % indicated for the resins always being 100 wt. %.

5. The process according to claim 1, wherein the connector base (B) comprises the same type of resins as toner base (A).

6. The process according to claim 1, wherein the connector base (B) comprises the same resins as toner base (A).

7. The process according to claim 1, wherein the process additionally comprises the step of mixing a cross-linker base (D) with toner base (A), connector base (B), and reducer base (C).

8. The process according to claim 7, wherein the cross-linker base (D) comprises an isocyanate hardener.

9. A process according to claim 1 wherein the coating composition prepared is a base coat composition.

10. A process according to claim 1 wherein the coating composition prepared is an interior coating composition.

11. A method of refinishing a car comprising preparing a base coat composition according to the process of claim 9 and applying the base coating composition to a car.

12. A method of finishing or refinishing the interior of a car comprising preparing an interior coating composition according to the process of claim 10 and applying the interior coating composition to an interior automotive part.

* * * * *

UNITED STATES PATENT AND TRADEMARK OFFICE
CERTIFICATE OF CORRECTION

PATENT NO.         : 7,208,534 B2
APPLICATION NO. : 09/992995
DATED              : April 24, 2007
INVENTOR(S)       : Arthur Jozef Gerardus Van Rooyen It is certified that error appears in the above-identified patent and that said Letters Patent is hereby corrected as shown below:

Claim 2, column 13, line 36          "polyisocyan ate,"

should read                          --polyisocyanate,--

Claim 4, column 14, line 9           "polyol."

should read                          --polyol,--

Signed and Sealed this

Twenty-third Day of October, 2007

JON W. DUDAS
*Director of the United States Patent and Trademark Office*